(12) United States Patent
Qu

(10) Patent No.: US 11,358,475 B2
(45) Date of Patent: Jun. 14, 2022

(54) MAGNETIC LEVITATION POWER SYSTEM

(71) Applicant: TEWARE, INC., Liaoning (CN)

(72) Inventor: Yang Qu, Liaoning (CN)

(73) Assignee: TEWARE, INC., Liaoning (CN)

( * ) Notice: Subject to any disclaimer, the term of this patent is extended or adjusted under 35 U.S.C. 154(b) by 811 days.

(21) Appl. No.: 16/313,128

(22) PCT Filed: Sep. 1, 2016

(86) PCT No.: PCT/CN2016/097768
§ 371 (c)(1),
(2) Date: Dec. 24, 2018

(87) PCT Pub. No.: WO2018/000573
PCT Pub. Date: Jan. 4, 2018

(65) Prior Publication Data
US 2019/0366853 A1 Dec. 5, 2019

(30) Foreign Application Priority Data

Jul. 1, 2016 (CN) .......................... 201610511569.3

(51) Int. Cl.
*B60L 13/08* (2006.01)
*B60L 13/10* (2006.01)
*H02N 15/00* (2006.01)

(52) U.S. Cl.
CPC ............... *B60L 13/08* (2013.01); *B60L 13/10* (2013.01); *H02N 15/00* (2013.01); *B60L 2200/26* (2013.01)

(58) Field of Classification Search
CPC ...... B60L 13/08; B60L 13/10; B60L 2200/26; B60L 200/26; H02N 15/00
See application file for complete search history.

(56) References Cited

U.S. PATENT DOCUMENTS 5,652,472 A * 7/1997 Tozoni .................... B60L 13/04
104/281
6,629,503 B2 * 10/2003 Post ........................ B60L 13/04
104/281
(Continued)

FOREIGN PATENT DOCUMENTS

CN 20010059891 A 7/2001
CN 1746046 A 3/2006
(Continued)

*Primary Examiner* — Scott A Browne
(74) *Attorney, Agent, or Firm* — Novick, Kim & Lee, PLLC; Allen Xue

(57) ABSTRACT

Provided is a magnetic levitation power system. The magnetic levitation power system includes: a magnetic power system disposed on a wheel hub and a driver shaft, where the magnetic power system generates a power capable of enabling a movement of the wheel hub through an interaction of magnetic fields between the wheel hub and the driver shaft; a first magnetic levitation system disposed on the wheel hub and the driver shaft, where the first magnetic levitation system is capable of enabling the wheel hub and the driver shaft to be in a levitation state within a circumferential extent of 360 degrees with the wheel hub being opposite to the driver shaft through the interaction of the magnetic fields between the wheel hub and the driver shaft; and a second magnetic levitation system disposed on the wheel hub and the driver shaft, where the second magnetic levitation system is capable of enabling the wheel hub and the driver shaft to be in a levitation state in a direction of a central axis of the wheel hub through the interaction of the magnetic fields between the wheel hub and the driver shaft. The present invention solves the problems of high hardware costs, low energy utilization rate, environmentally harmful characteristics, etc. of the existing automobile power system.

10 Claims, 3 Drawing Sheets

(56) References Cited

U.S. PATENT DOCUMENTS

| | | | | |
|---|---|---|---|---|
| 7,185,590 | B2 * | 3/2007 | Fu | H02N 1/08 |
| | | | | 104/281 |
| 8,047,138 | B2 * | 11/2011 | Tozoni | B60L 13/10 |
| | | | | 104/283 |
| 2010/0005997 | A1 * | 1/2010 | Tozoni | B60L 13/10 |
| | | | | 104/283 |
| 2015/0145363 | A1 * | 5/2015 | Haile | B60B 27/02 |
| | | | | 310/90.5 |
| 2019/0366853 | A1 * | 12/2019 | Qu | B60K 7/0007 |
| 2021/0354568 | A1 * | 11/2021 | Wamble, III | B60L 13/04 |

FOREIGN PATENT DOCUMENTS

| | | |
|---|---|---|
| CN | 101034862 A | 9/2007 |
| CN | 201966845 U | 9/2011 |
| CN | 103427538 A | 12/2013 |
| CN | 104176171 A | 12/2014 |
| CN | 204065724 U | 12/2014 |
| CN | 104901588 A | 9/2015 |
| CN | 204821193 U | 12/2015 |

* cited by examiner

MAGNETIC LEVITATION POWER SYSTEM

TECHNICAL FIELD

The present invention relates to a magnetic levitation power system.

BACKGROUND

Power systems in a prior art all have some technical problems of high hardware costs. A power system of an automobile in a prior art is taken as an example for illustration below. According to the development of the power technology, the automobile may be divided into: a steam-powered automobile, an internal combustion engine (ICE) automobile and an electric motor automobile. The mainstream automobile in the market today is still an ICE automobile, the engine of which is powered by fuel combustion. With the development of new energy automobiles, pure electric automobiles have gradually become the mainstream trend of future development. In view of several major innovations, the generation of the motive power of the automobile power system has always relied on the engine. Current automobile power system refers to a whole mechanical configuration process of transferring the power generated by the engine through a series of power transmissions and finally to the wheels. An operation of the engine is actually a rotating of the crankshaft, one end of the crankshaft is fixedly connected to a flywheel, and the flywheel cooperates with a clutch to control a connection between the flywheel and a transmission. After being shifted through the transmission, the power continues to be transmitted through a cardan joint and a drive shaft to a differential, and then the power is transmitted to retarder on both sides of the wheels after being averaged by the differential, and then the power is transmitted through a hyperbolic gear of the retarder to the wheels. In the prior art, the technical problems described below mainly exist in the automotive power system. The first problem is that the hardware cost is high as the structural components needs to include an engine, a transmission, a differential and a damping apparatus. The second problem is that non-renewable energy needs to be consumed. The third problem is that environmental pollution is likely to be caused. The fourth problem is that the shaft wears seriously, and energy loss is large.

SUMMARY

To solve the above problems, the present invention develops a magnetic levitation power system.

The technical means of the present invention are described below.

A magnetic levitation power system is disposed on a wheel hub and a driver shaft and includes:
a magnetic power system disposed on the wheel hub and the driver shaft, where the magnetic power system generates a power capable of enabling a movement of the wheel hub through an interaction of magnetic fields between the wheel hub and the driver shaft;
a first magnetic levitation system disposed on the wheel hub and the driver shaft, where the first magnetic levitation system is capable of enabling the wheel hub and the driver shaft to be in a levitation state within a circumferential extent of 360 degrees with the wheel hub being opposite to the driver shaft through the interaction of the magnetic fields between the wheel hub and the driver shaft; and
a second magnetic levitation system disposed on the wheel hub and the driver shaft, where the second magnetic levitation system is capable of enabling the wheel hub and the driver shaft to be in a levitation state in a direction of a central axis of the wheel hub through the interaction of the magnetic fields between the wheel hub and the driver shaft.

Further, the driver shaft is not self-rotating.

Further, the magnetic levitation power system includes an electrical energy supply device for powering the magnetic power system, the first magnetic levitation system and the second magnetic levitation system, where an output current of the electrical energy supply device is adjusted for changing a direction of a power provided by the magnetic power system, a magnitude of the power provided by the magnetic power system, and/or a levitation distance between the wheel hub and the driver shaft.

Further, the magnetic levitation power system includes a distance sensor disposed on the driver shaft and/or the wheel hub for measuring the levitation distance between the wheel hub and the driver shaft.

In addition, the magnetic levitation power system further includes a control system connected to the electrical energy supply device and the distance sensor, where the control system is configured to adjust the output current of the electrical energy supply device according to measurement data of the distance sensor so that the levitation distance between the wheel hub and the driver shaft is maintained at a safe levitation distance; and the control system is further configured to adjust the output current of the electrical energy supply device to change the magnitude and/or the direction of the power provided by the magnetic power system when an object to which the magnetic levitation power system is applied has a speed and/or direction change demand.

Further, the magnetic power system includes:
a rotor disposed on the wheel hub; and
a stator disposed on the driver shaft.

Further, the first magnetic levitation system includes:
a first permanent magnet component disposed on the wheel hub; and
a first electromagnetic component disposed on the driver shaft and disposed opposite the first permanent magnet component.

Further, the second magnetic levitation system includes:
a second permanent magnet component disposed on the wheel hub; and
a second electromagnetic component disposed on the driver shaft and disposed opposite the second permanent magnet component.

Further, at least one of the magnetic power systems, at least one of the first magnetic levitation systems, and/or at least one of the second magnetic levitation systems are provided.

With the above technical solutions, the magnetic levitation power system provided by the present invention may be used to solve the problems of high hardware costs, low energy utilization rate, environmentally harmful characteristics, etc. of the existing automobile power system, and can abandon structural components of the existing automobile, such as an engine, a transmission, a differential, and a damping apparatus, and therefore hardware costs are reduced, losses in the energy conversion process are reduced, and air pollution from exhaust emissions is avoided.

BRIEF DESCRIPTION OF DRAWINGS

To illustrate technical solutions in the present invention or in a prior art more clearly, drawings used in description of the present invention or the prior art will be briefly described below. Apparently, the drawings described below illustrate only part of the embodiments of the present invention, and those skilled in the art may obtain other drawings based on the drawings described below on the premise that no creative work is done.

Figure 1:
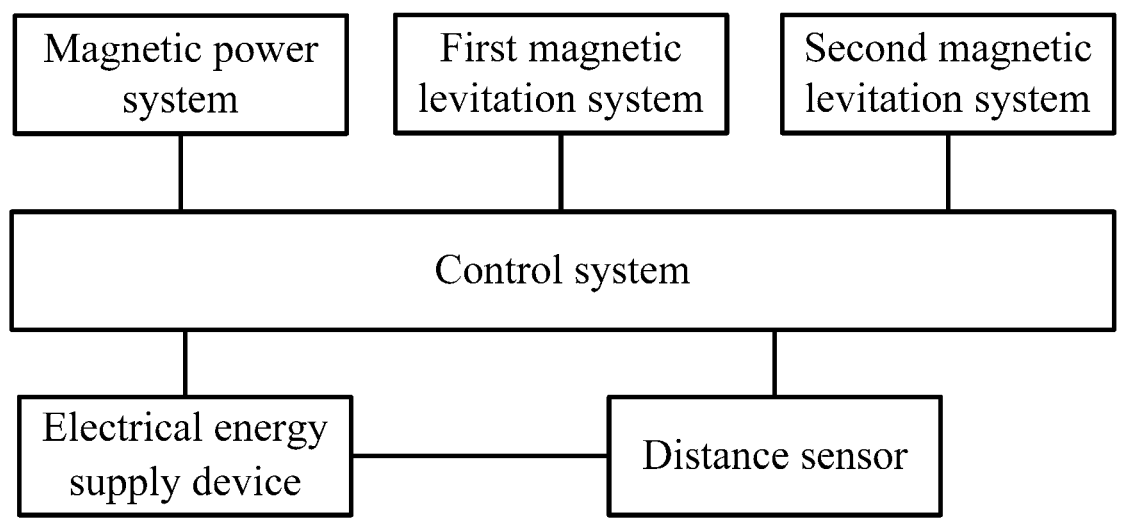
FIG. 1 is a structural block diagram of a magnetic levitation power system provided by the present invention.

In the drawings: 1. Driver shaft, 2. Wheel hub, 3. Stator, 4. Rotor, 5. Second electromagnetic component, 6. Second permanent magnet component, 7. First electromagnetic component, 8. First permanent magnet component, 9. Distance sensor, 10. Space portion, 11. Straight shaft, 12. Driver shaft annular ring, 13. Driver shaft connecting portion, 21. Inner annular ring of the wheel hub, 22. Outer annular ring of the wheel hub, 23. Wheel hub connecting portion, a. Magnetic power system, b. First magnetic levitation system, c. Second magnetic levitation system.

DETAILED DESCRIPTION

To illustrate the object, technical solutions and advantages of the present invention more clearly, the technical solutions of the present invention will be described clearly and completely in conjunction with drawings. Apparently, the embodiments described below are part, not all, of embodiments of the present invention. Based on the embodiments of the present invention, all other embodiments obtained by those skilled in the art are within the scope of the present invention on the premise that no creative work is done.

Figure 2:
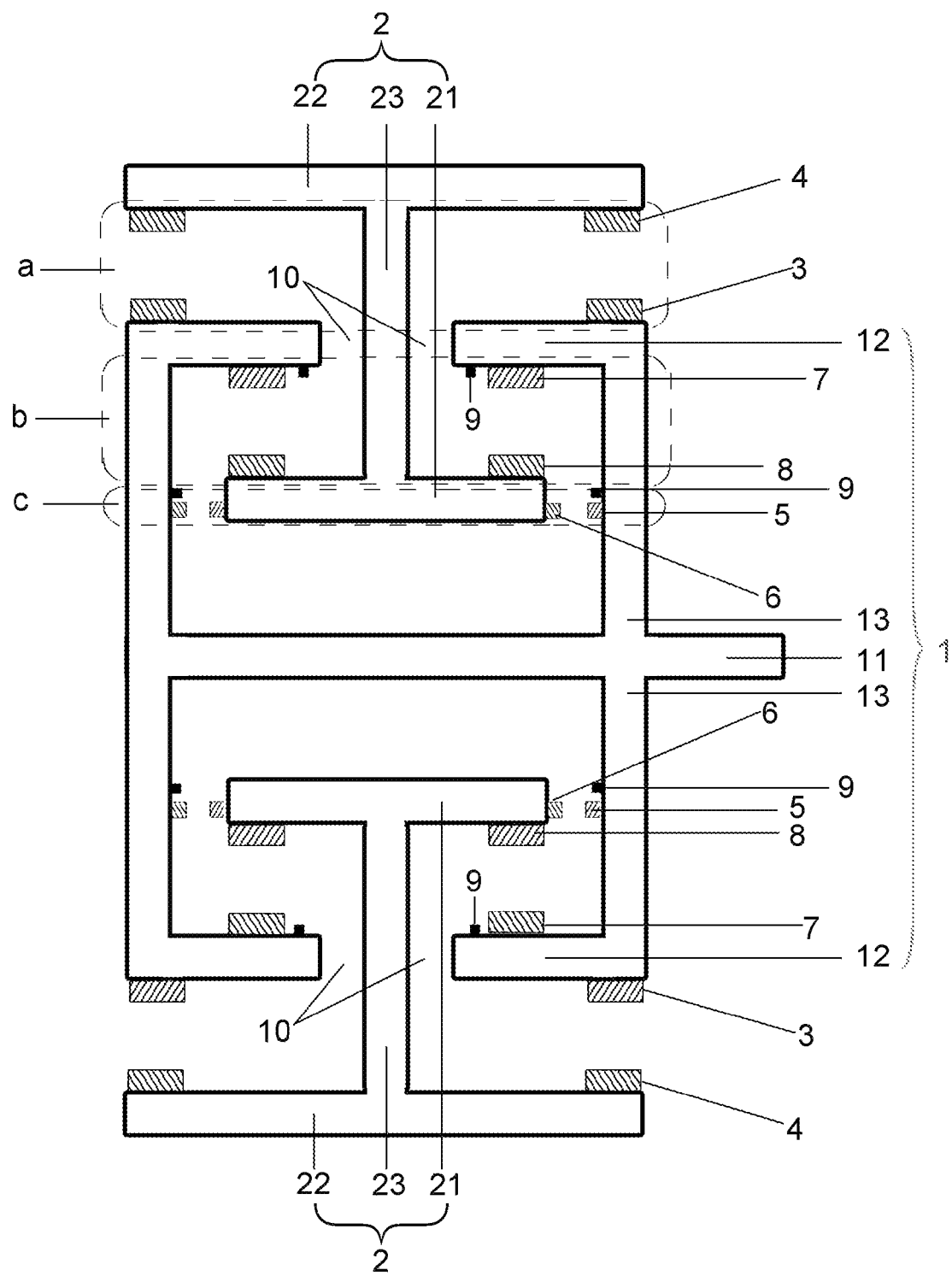
FIG. 2 is a structural diagram of a magnetic levitation power system according to embodiment 1 of the present invention, specifically, a sectional view of a single wheel hub and a driver shaft.

FIG. 1 is a structural block diagram of a magnetic levitation power system provided by the present invention. FIG. 2 is a structural diagram of a magnetic levitation power system according to embodiment 1 of the present invention, specifically, a sectional view of a single wheel hub 2 and a driver shaft 1. As shown in FIGS. 1 and 2, the magnetic levitation power system according to embodiment 1 is provided on the wheel hub 2 and the driver shaft 1 and includes: a magnetic power system a disposed on the wheel hub 2 and the driver shaft 1, where the magnetic power system a is configured to generate a power capable of enabling a movement of the wheel hub 2 through an interaction of magnetic fields between the wheel hub 2 and the driver shaft 1; a first magnetic levitation system b disposed on the wheel hub 2 and the driver shaft 1, where the first magnetic levitation system b is capable of enabling the wheel hub 2 and the driver shaft 1 to be in a levitation state within a circumferential extent of 360 degrees with the wheel hub 2 being opposite to the driver shaft 1 through the interaction of the magnetic fields between the wheel hub 2 and the driver shaft 1, and further the driver shaft 1 is levitated at a distance from the circumferential direction of the wheel hub 2; and a second magnetic levitation system c disposed on the wheel hub 2 and the driver shaft 1, where the second magnetic levitation system c is capable of enabling the wheel hub 2 and the driver shaft 1 to be in a levitation state in a direction of a central axis the wheel hub 2 through the interaction of the magnetic fields between the wheel hub 2 and the driver shaft 1. Preferably, the magnetic power system a, the first magnetic levitation system b and the second magnetic levitation system c are disposed at different locations of the wheel hub 2 and the driver shaft 1. Further, as shown in FIG. 2, the wheel hub 2 includes: an inner annular ring of the wheel hub 21, an outer annular ring of the wheel hub 22, and a wheel hub connecting portion 23 disposed between the inner annular ring of the wheel hub 21 and the outer annular ring of the wheel hub 22, where the inner annular ring of the wheel hub 21 and the outer annular ring of the wheel hub 22 are connected by the wheel hub connecting portion 23 and a space portion 10 is formed between the inner annular ring of the wheel hub 21, the outer annular ring of the wheel hub 22 and the wheel hub connecting portion 23. The driver shaft includes: a straight shaft 11, a driver shaft annular ring 12 centered around the straight shaft 11 and a driver shaft connecting portion 13 disposed between the driver shaft annular ring 12 and the straight shaft 11, where the driver shaft annular ring 12 is connected to the straight shaft 11 through the driver shaft connecting portion 13 and disposed in the space portion 10. Further, the magnetic power system a is disposed on an inner side of the outer annular ring of the wheel hub 22 and on an outer side of driver shaft annular ring 12. The magnetic power system a includes: a rotor 4 disposed on an inner circumference of the outer annular ring of the wheel hub 22; and a stator 3 disposed on an outer circumference of the driver shaft annular ring 12. Further, the first magnetic levitation system b is disposed on an outer side of the inner annular ring of the wheel hub 21 and an inner side of the driver shaft annular ring 12. The first magnetic levitation system b includes: a first permanent magnet component 8 disposed on an outer circumference of the inner annular ring of the wheel hub 21; and a first electromagnetic component 7 disposed on an inner circumference of the driver shaft annular ring 12 and disposed opposite to the first permanent magnet component 8. Preferably, multiple first permanent magnet components 8 and multiple first electromagnetic components 7 are provided, and each of the multiple first electromagnetic components 7 may be disposed opposite to a respective one of the multiple first permanent magnet components 8. Further, the second magnetic levitation system c is disposed on a side wall of the inner annular ring of the wheel hub 21 and on the driver shaft connecting portion 13. The second magnetic levitation system c includes: a second permanent magnet component 6 disposed on the side wall of the inner annular ring of the wheel hub 21; and a second electromagnetic component 5 disposed on the driver shaft connecting portion 13 and disposed opposite to the second permanent magnet component 6. Preferably, multiple second permanent magnet components 6 and multiple second electromagnetic components 5 are provided, and each of the multiple second electromagnetic components 5 may be disposed opposite to a respective one of the multiple second permanent magnet components 6. Further, the driver shaft 1 is not self-rotating. In addition, the magnetic levitation power system further includes: an electrical energy supply device for powering the magnetic power system a, the first magnetic levitation system b and the second magnetic levitation system c, where an output current of the electrical energy supply device is adjusted for changing a direction of a power provided by the magnetic power system a, a magnitude of the power provided by the magnetic power system a, and/or a levitation distance between the wheel hub 2 and the driver shaft 1. In addition, the magnetic levitation power system further includes a distance sensor 9 disposed on the driver shaft 1 and/or the wheel hub 2 for measuring the levitation distance between the wheel hub 2 and the driver shaft 1. Further, the magnetic levitation power system further includes a control system connected to the electrical energy supply device and the distance sensor 9, where the control system is configured to adjust the output current of the electrical energy supply device according to measurement data of the distance sensor 9 so that the levitation distance between the wheel hub 2 and the driver shaft 1 is maintained at a safe levitation distance and is further configured to adjust the output current of the electrical energy supply device to change the magnitude and/or the direction of the power provided by the magnetic power system a when an object to which the magnetic levitation power system is applied has a speed and/or direction change requirement. Further, the positions of the magnetic power system a and the first magnetic levitation system b shown in FIG. 2 may be interchanged. In a magnetic levitation power system of embodiment 1, the space portion 10 is disposed in an annular groove between the inner annular ring of the wheel hub 21 and the outer annular ring of the wheel hub 22, and the driver shaft annular ring 12 is placed at the annular groove. Two driver shaft annular rings 12 are provided and each thereof is connected to the straight shaft 11 through an annular planar structure in which the driver shaft connecting portion 13 may be in practice. Whether the magnetic power system a generates power is determined by controlling whether the stator 3 is energized, and the direction of the power generated by the magnetic power system a is determined by a direction of a current after the stator 3 is energized, where the direction of the power refers to pushing the wheel hub 2 to move forward or backward. The driver shaft 1 is not self-rotating, which means that the driver shaft 1 here is different from a transmission shaft and a driver shaft which self-rotates continuously in a moving state to drive the wheel hub to rotate in the prior art. The driver shaft itself is not self-rotating. The positions of the magnetic power system a and the first magnetic levitation system b in this embodiment may be interchanged. Further, at least one of the magnetic power systems a, at least one of the first magnetic levitation systems b and/or at least one of the second magnetic levitation systems c are provided. The magnetic power system a, the first magnetic levitation system b and the second magnetic levitation system c mentioned here can be increased to be with multiple turns, multiple layers or the like by increasing the number of the driver shaft annular rings 12, the number of the inner annular rings of the wheel hub 21, the number of the outer annular rings of the wheel hub 22, the number of the driver shaft connecting portions 13, the number of the wheel hub connecting portions 23, the numbers of the rotors 4 and the stators 3 included in the magnetic power system a, the numbers of the first permanent magnet components 8 and the first electromagnetic components 7 included in the first magnetic levitation system b, and the numbers of the second permanent magnet components 6 and the second electromagnetic components 5 included in the second magnetic levitation system c.

Figure 3:
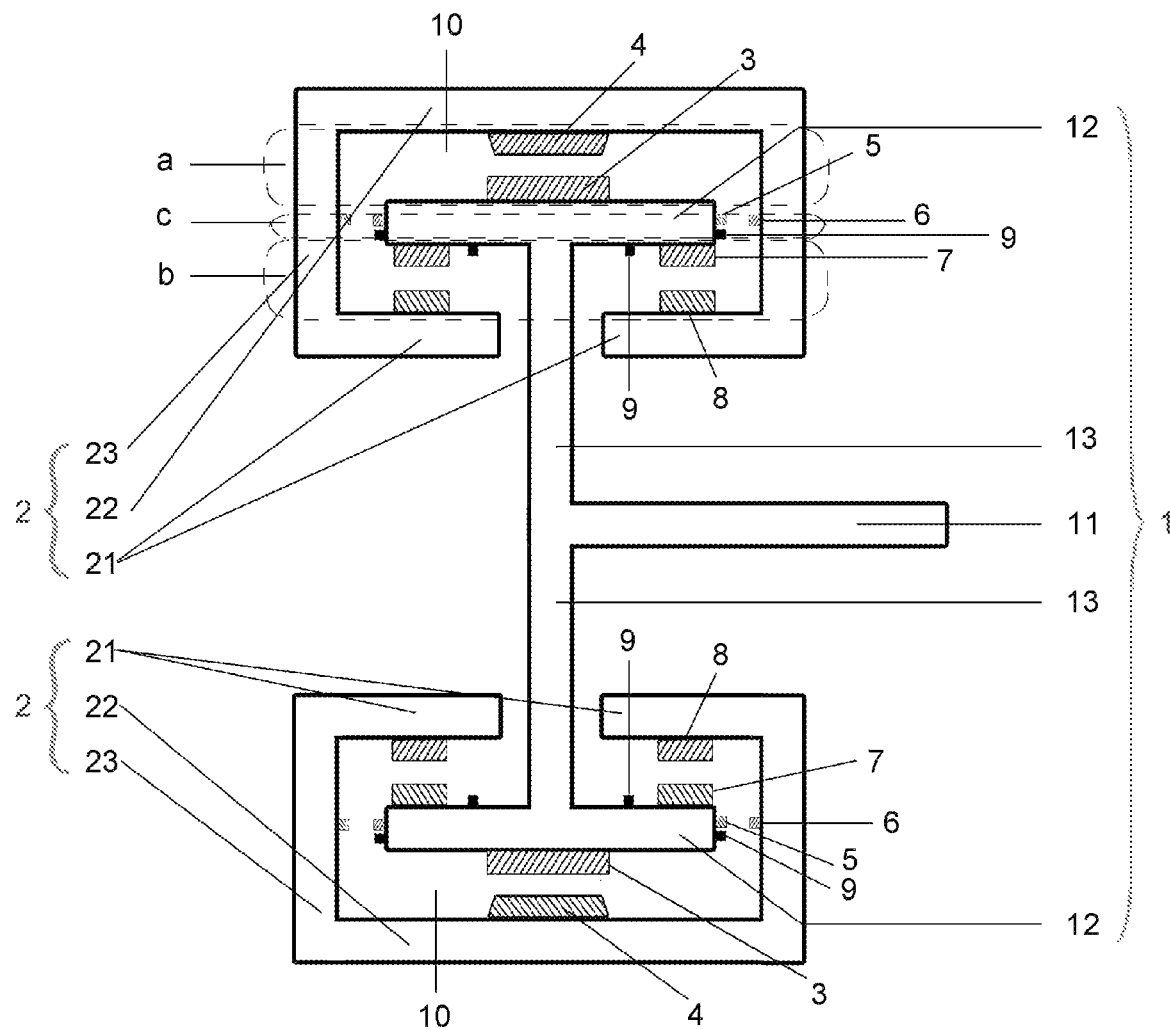
FIG. 3 is a structural diagram of a magnetic levitation power system according to embodiment 2 of the present invention, specifically, a sectional view of a single wheel hub and a driver shaft.

FIG. 1 is a structural block diagram of a magnetic levitation power system provided by the present invention. FIG. 3 is a structural diagram of a magnetic levitation power system according to embodiment 2 of the present invention, specifically, a sectional view of a single wheel hub 2 and a driver shaft 1. As shown in FIGS. 1 and 3, the magnetic levitation power system according to embodiment 2 is provided on the wheel hub 2 and the driver shaft 1. The magnetic levitation power system includes: a magnetic power system a disposed on the wheel hub 2 and the driver shaft 1, where the magnetic power system a is configured to generate a power capable of enabling a movement of the wheel hub 2 through an interaction of magnetic fields between the wheel hub 2 and the driver shaft 1; a first magnetic levitation system b disposed on the wheel hub 2 and the driver shaft 1, where the first magnetic levitation system b is capable of enabling the wheel hub 2 and the driver shaft 1 to be in a levitation state within a circumferential extent of 360 degrees with the wheel hub 2 being opposite to the driver shaft 1 through the interaction of the magnetic fields between the wheel hub 2 and the driver shaft 1, and the driver shaft 1 is levitated at a distance from the circumferential direction of the wheel hub 2; and a second magnetic levitation system c disposed on the wheel hub 2 and the driver shaft 1, where the second magnetic levitation system c is capable of enabling the wheel hub 2 and the driver shaft 1 to be in a levitation state in a direction of a central axis of the wheel hub 2 through the interaction of the magnetic fields between the wheel hub 2 and the driver shaft 1. Preferably, the magnetic power system a, the first magnetic levitation system b and the second magnetic levitation system c are disposed at different locations of the wheel hub 2 and the driver shaft 1. Further, the wheel hub 2 includes: an inner annular ring of the wheel hub 21, an outer annular ring of the wheel hub 22, and a wheel hub connecting portion 23 disposed between the inner annular ring of the wheel hub 21 and the outer annular ring of the wheel hub 22. The inner annular ring of the wheel hub 21 and the outer annular ring of the wheel hub 22 are connected by the wheel hub connecting portion 23 and a space portion 10 is formed between the inner annular ring of the wheel hub 21, the outer annular ring of the wheel hub 22 and the wheel hub connecting portion 23. Further, the driver shaft is not self-rotating and includes: a straight shaft 11, a driver shaft annular ring 12 centered around the straight shaft 11 and a driver shaft connecting portion 13 disposed between the driver shaft annular ring 12 and the straight shaft 11. The driver shaft annular ring 12 is connected to the straight shaft 11 through the driver shaft connecting portion 13 and disposed in the space portion 10. Further, the magnetic power system a is disposed on an inner side of the outer annular ring of the wheel hub 22 and on an outer side of driver shaft annular ring 12. The magnetic power system a includes: a rotor 4 disposed on an inner circumference of the outer annular ring of the wheel hub 22; and a stator 3 disposed on an outer circumference of the driver shaft annular ring 12. Further, the first magnetic levitation system b is disposed on an outer side of the inner annular ring of the wheel hub 21 and an inner side of the driver shaft annular ring 12. The first magnetic levitation system b includes: a first permanent magnet component 8 disposed on an outer circumference of the inner annular ring of the wheel hub 21; and a first electromagnetic component 7 disposed on an inner circumference of the driver shaft annular ring 12 and disposed opposite to the first permanent magnet component 8. Preferably, multiple first permanent magnet components 8 and multiple first electromagnetic components 7 are provided, and each of the multiple first electromagnetic components 7 may be disposed opposite to a respective one of the multiple first permanent magnet components 8. Further, the second magnetic levitation system c is disposed on the wheel hub connecting portion 23 and on a side wall of the driver shaft annular ring 12. The second magnetic levitation system c includes: a second permanent magnet component 6 disposed on the wheel hub connecting portion 23; and a second electromagnetic component 5 disposed on the side wall of the driver shaft annular ring 12 and disposed opposite to the second permanent magnet component 6. Preferably, multiple second permanent magnet components 6 and multiple second electromagnetic components 5 are provided, and each of the multiple second electromagnetic components 5 may be disposed opposite to a respective one of the multiple second permanent magnet components 6. In addition, the magnetic levitation power system further includes an electrical energy supply device for powering the magnetic power system a, the first magnetic levitation system b and the second magnetic levitation system c. An output current of the electrical energy supply device is adjusted for changing a direction of a power provided by the magnetic power system a, a magnitude of the power provided by the magnetic power system a, and/or a levitation distance between the wheel hub 2 and the driver shaft 1. In addition, the magnetic levitation power system further includes a distance sensor 9 disposed on the driver shaft 1 and/or the wheel hub 2 for measuring the levitation distance between the wheel hub 2 and the driver shaft 1. Further, the magnetic levitation power system further includes a control system connected to the electrical energy supply device and the distance sensor 9, where the control system is configured to adjust the output current of the electrical energy supply device according to measurement data of the distance sensor 9 so that the levitation distance between the wheel hub 2 and the driver shaft 1 is maintained at a safe levitation distance. The control system is further configured to adjust the output current of the electrical energy supply device to change the magnitude and/or the direction of the power provided by the magnetic power system a when an object to which the magnetic levitation power system is applied has a speed and/or direction change requirement. Further, the positions of the magnetic power system a and the first magnetic levitation system b shown in FIG. 3 may be interchanged. In a magnetic levitation power system of embodiment 2, the space portion 10 is specifically disposed in a receiving space between the inner annular ring of the wheel hub 21, the outer annular ring of the wheel hub 22, and the wheel hub connecting portion 23. The wheel hub connecting portion 23 here may be an annular baffle disposed between the inner annular ring of the wheel hub 21 and the outer annular ring of the wheel hub 22. The number of the driver shaft annular ring 12 may be one and disposed in the receiving space. Whether the magnetic power system a generates power is determined by controlling whether the stator 3 is energized, and the direction of the power generated by the magnetic power system a is determined by a direction of a current after the stator 3 is energized, where the direction of the power specifically refers to pushing the wheel hub 2 to move forward or backward. The driver shaft 1 is not self-rotating, which means that the driver shaft 1 here is different from a transmission shaft and a driver shaft which self-rotates continuously in a moving state to drive the wheel hub to rotate in the prior art. The driver shaft itself is not self-rotating. The positions of the magnetic power system a and the first magnetic levitation system b in the embodiment may be interchanged. Further, at least one of the magnetic power systems a, at least one of the first magnetic levitation systems b and/or at least one of the second magnetic levitation systems c are provided. The magnetic power system a, the first magnetic levitation system b and the second magnetic levitation system c mentioned here can be increased to be with multiple turns, multiple layers or the like by increasing the number of the driver shaft annular rings 12, the number of the inner annular rings of the wheel hub 21, the number of the outer annular rings of the wheel hub 22, the number of the driver shaft connecting portions 13, the number of the wheel hub connecting portions 23, the numbers of the rotors 4 and the stators 3 included in the magnetic power system a, the numbers of the first permanent magnet component 8 and the first electromagnetic component 7 included in the first magnetic levitation system b, and the numbers of the second permanent magnet component 6 and the second electromagnetic component 5 included in the second magnetic levitation system c.

The magnetic levitation power system of the present invention can be applied not only to automobiles, but also to other power systems that may use related structures, such as vehicles, tanks, airplanes, etc. Taking automobiles for an example, in the automobile power system of the prior art, a driver shaft is in a straight shaft structure and connected by the transmission shaft. Then, the driver shaft is connected to a wheel hub having a fork through screws, and rotates to drive the wheel hub to move. In the present invention, the driver shaft 1 having the driver shaft annular ring 12 is adopted, and keeps balance with the wheel hub 2 through the magnetic levitation. In the magnetic levitation power system, the motive power is not provided by the engine, the rotation of the driver shaft 1 is not used to drive the wheel hub 2 to move as the driver shaft is not self-rotating, and then the magnetic power between the driver shaft 1 and the wheel hub 2 is used to provide the power for pushing a movement of the wheel hub 2. The second magnetic levitation system c is capable of generating a safety control force against collision and detachment in the direction of the central axis of the wheel hub 2. A storage battery is used as the electrical energy supply device of the present invention. The second magnetic levitation system c is capable of generating a safety control force against collision and detachment in the direction of the central axis of the wheel hub 2. The electrical energy supply device is configured to power the magnetic power system a, the first magnetic levitation system b, and the second magnetic levitation system c, specifically, to power the stator 3, the first electromagnetic component 7 and the second electromagnetic component 5. Through an adjustment of the output current of the electrical energy supply device, the current intensity and direction of the current flowing through the stator 3, the first electromagnetic component 7 and/or the second electromagnetic component 5 can be changed so that a control of vehicle body motion and the levitation distance between the wheel hub 2 and the driver shaft 1 are achieved. Here, the current intensity and direction of the current flowing through the stator 3, the first electromagnetic component 7 and/or the second electromagnetic component 5 can be adjusted and controlled by the control system which may be a computer control system. Permanent magnets may be used as the first permanent magnet component 8 and the second permanent magnet component 6, and superconducting magnets may be used as the first electromagnetic component 7 and the second electromagnetic component 5. The distance sensor 9 is configured to measure the levitation distance between the wheel hub 2 and the driver shaft 1, for example, when the weight of the vehicle body changes, the distance between the wheel hub 2 and the driver shaft 1 will increase or decrease, and the distance sensor 9 can detect the corresponding distance change. The levitation distance between the wheel hub 2 and the driver shaft 1 here includes the levitation distance between the wheel hub 2 and the driver shaft 1 within a circumferential extent of 360 degrees with the wheel hub 2 being opposite to the driver shaft 1 and the levitation distance between the wheel hub 2 and the driver shaft 1 in the direction of the central axis of the wheel hub 2. The specific positions and numbers of the stator 3, the first electromagnetic component 7, the second electromagnetic component 5, the rotor 4, the first permanent magnet component 8, the second permanent magnet component 6, and the distance sensor 9 of the present invention are not limited to what is shown in FIGS. 2 and 3, and can be set and adjusted according to actual application requirements. The magnetic levitation power system of the present invention is not limited to embodiment 1 and embodiment 2, that is, not limited to what is shown in FIGS. 2 and 3. In practice, the magnetic power system a, the first magnetic levitation system b and/or the second magnetic levitation system c can be increased to be with multiple turns, multiple layers or the like by increasing the number of the driver shaft annular rings 12, the number of the inner annular rings of the wheel hub 21, the number of the outer annular rings of the wheel hub 22, the number of the driver shaft connecting portions 13, the number of the wheel hub connecting portions 23, the numbers of the rotors 4 and the stators 3 included in the magnetic power system a, the numbers of the first permanent magnet components 8 and the first electromagnetic components 7 included in the first magnetic levitation system b, and the numbers of the second permanent magnet components 6 and the second electromagnetic components 5 included in the second magnetic levitation system c. The positions of the magnetic power system a, the first magnetic levitation system b and/or the second magnetic levitation system c may be interchanged according to actual and specific application requirements.

The specific operation of the magnetic levitation power system of the present invention will be described below by setting the magnetic pole directions of the first permanent magnet component 8 and the second permanent magnet component 6. Assume that the magnetic pole directions of the first permanent magnet component 8 and the second permanent magnet component 6 are N pole. When the vehicle body moves, the stator 3 is energized, and then the magnetic fields between the stator 3 and the rotor 4 interact to generate a power that can push the movement of the wheel hub 2. The control system may change the magnitude and direction of the current flowing through the stator 3 to adjust the speed of the vehicle and the direction of the power which determines whether the vehicle goes forward or backward. At the same time, the second electromagnetic component 5 is energized and be maintained with the magnetic pole direction at the N pole, and then the second electromagnetic component 5 and the second permanent magnet component 6 form a pair of repulsive magnetic poles. Due to the presence of the above-mentioned repulsive magnetic poles, the wheel hub 2 and the driver shaft 1 are kept levitated in the direction of the central axis of the wheel hub 2, so a safety control force against collision and detachment is generated. At the same time, the multiple first electromagnetic components 7 disposed on the outer circumference of the inner annular ring of the wheel hub 21 are energized such that the magnetic pole direction of an upper half portion of a first electromagnetic component 7 in a vertical direction is the N pole, the magnetic pole direction of a lower half portion of the first electromagnetic component 7 in the vertical direction is the S pole, the magnetic pole direction of a front half portion of the first electromagnetic component 7 in a horizontal direction is the N pole, and the magnetic pole direction of a rear half portion of the first electromagnetic component 7 in the horizontal direction is the S pole. The front half portion and the rear half portion in the horizontal direction are subject to the direction of the vehicle body, that is, the front half portion is close to the front of the vehicle, and the rear half portion is close to the rear of the vehicle. Then the gravity of the driver shaft 1 itself is overcome by two forces together between the first electromagnetic component 7 and the first permanent magnet component 8 in the vertical direction, the vehicle body motion power is transmitted by two forces together between the first electromagnetic component 7 and the first permanent magnet component 8 in the horizontal direction, and the wheel hub 2 and the driver shaft 1 are kept in a levitation balance state. When the vehicle body is horizontally stationary in an energized state, the current flowing through the stator 3 is adjusted to zero. At this time, the motion power of the vehicle body is zero. The vehicle body remains stationary, the first electromagnetic component 7 and the second electromagnetic component 5 remain energized, and the second electromagnetic component 5 and the second permanent magnet component 6 remain as a pair of repulsive magnetic poles. For the first electromagnetic component 7 disposed in the vertical direction, the current is maintained to be consistent with the current in the moving state of the vehicle body, and for the first electromagnetic component 7 disposed in the horizontal direction, the current is adjusted such that the magnetic pole directions of both the front half portion and the rear half portion of the first electromagnetic component 7 in the horizontal direction are the N pole, and thus the driver shaft 1 and the wheel hub 2 can be kept in a levitation balance state.

The magnetic levitation power system provided by the present invention solves the problems of high hardware costs, low energy utilization rate, environmentally harmful characteristics, etc. of the existing automobile power system, and can abandon structural components of the existing automobile, such as an engine, a transmission, a differential, and a damping apparatus, and therefore hardware costs are reduced, losses in the energy conversion process are reduced, and air pollution from exhaust emissions is avoided. Specifically, the magnetic levitation power system provided by the present invention has the advantages listed below over the existing automobile power system.

| Parameter | Power system | | |
| --- | --- | --- | --- |
| | Existing ICE automobile | Existing electric motor automobile | Present invention |
| Does it include an engine? | Yes (ICE) | Yes (electric motor) | No |
| Does it include a gearbox? | Yes | Yes | No |
| Does it include a brake disc/pad? | Yes | Yes | No |
| Does it include a differential? | Yes | Yes | No |
| Does it include a docking apparatus? | Yes | Yes | No |
| Does driver shaft wear exist? | Yes | Yes | No |
| Vehicle cost | High | High | Low |
| Energy conversion loss | Large | Small | Small |
| Air pollution | Serious | No | No |

The above are only preferred embodiments of the present invention and are not intended to limit the scope of the present invention. Any equivalent substitutions or modifications, made by those skilled in the art, of the technical solutions and the inventive concepts thereof within the scope of the present invention should be included in the scope of the present invention.

What is claimed is:
1. A magnetic levitation power system, comprising:
a magnetic power system configured to be disposed on a wheel hub and a driver shaft, wherein the magnetic power system is configured to generate a power capable of enabling a movement of the wheel hub through an interaction of magnetic fields between the wheel hub and the driver shaft;

a first magnetic levitation system configured to be disposed on the wheel hub and the driver shaft, wherein the first magnetic levitation system enables the wheel hub and the driver shaft to be in a levitation state within a circumferential extent of 360 degrees with the wheel hub being opposite to the driver shaft through the interaction of the magnetic fields between the wheel hub and the driver shaft;

a second magnetic levitation system configured to be disposed on the wheel hub and the driver shaft, wherein the second magnetic levitation system enables the wheel hub and the driver shaft to be in a levitation state in a direction of a central axis of the wheel hub through the interaction of the magnetic fields between the wheel hub and the driver shaft; and an electrical energy supply device connected to and configured to power the magnetic power system, the first magnetic levitation system, and the second magnetic levitation system, wherein an output current of the electrical energy supply device is adjustable to change a direction of a power provided by the magnetic power system, a magnitude of the power provided by the magnetic power system, and/or a levitation distance between the wheel hub and the driver shaft.

2. The magnetic levitation power system of claim 1, wherein the driver shaft is not self-rotating.

3. The magnetic levitation power system of claim 1, further comprising a distance sensor configured to be disposed on the driver shaft and/or the wheel hub and for measuring the levitation distance between the wheel hub and the driver shaft.

4. The magnetic levitation power system of claim 3, further comprising a control system connected to the electrical energy supply device and the distance sensor, wherein the control system is configured to adjust the output current of the electrical energy supply device according to measurement data of the distance sensor so that the levitation distance between the wheel hub and the driver shaft is maintained at a pre-determined levitation distance, and the control system is further configured to adjust the output current of the electrical energy supply device to change a magnitude and/or a direction of the power provided by the magnetic power system when an object to which the magnetic levitation power system is applied has a speed and/or a direction change requirement.

5. The magnetic levitation power system of claim 1, wherein the magnetic power system comprises:
a rotor configured to be disposed on the wheel hub; and
a stator configured to be disposed on the driver shaft.

6. The magnetic levitation power system of claim 2, wherein the magnetic power system comprises:
a rotor configured to be disposed on the wheel hub; and
a stator configured to be disposed on the driver shaft.

7. The magnetic levitation power system of claim 3, wherein the magnetic power system comprises:
a rotor configured to be disposed on the wheel hub; and
a stator configured to be disposed on the driver shaft.

8. The magnetic levitation power system of claim 4, wherein the magnetic power system comprises:
a rotor configured to be disposed on the wheel hub; and
a stator configured to be disposed on the driver shaft.

9. The magnetic levitation power system of claim 5, wherein the first magnetic levitation system comprises:
a first permanent magnet component configured to be disposed on the wheel hub; and
a first electromagnetic component configured to be disposed on the driver shaft and disposed opposite to the first permanent magnet component.

10. The magnetic levitation power system of claim 9, wherein the second magnetic levitation system comprises:
a second permanent magnet component configured to be disposed on the wheel hub; and
a second electromagnetic component configured to be disposed on the driver shaft and disposed opposite to the second permanent magnet component.

* * * * *